April 28, 1970 — V. SHANOK ET AL — 3,509,001
SIMULATED WOOD TRIM STRIP
Filed Jan. 12, 1966
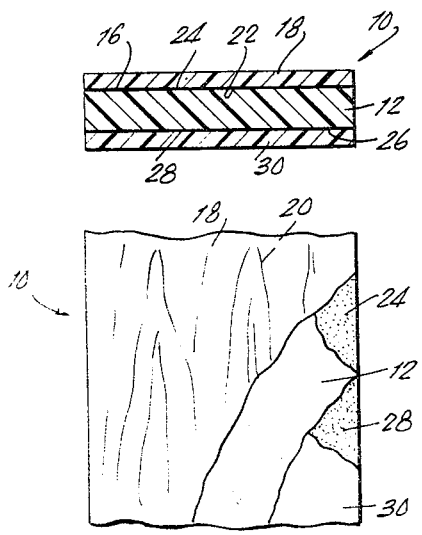
FIG. 1
FIG. 2
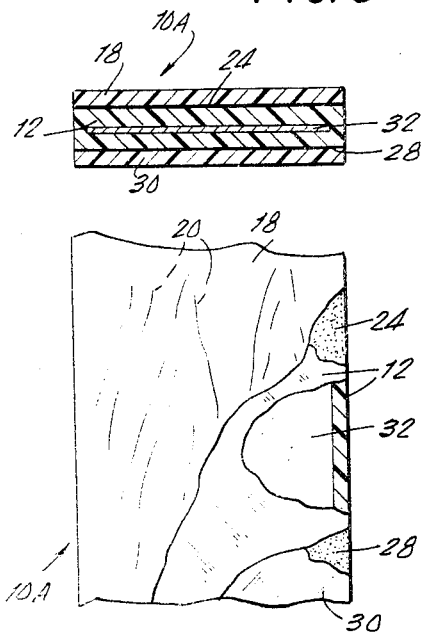
FIG. 3
FIG. 4
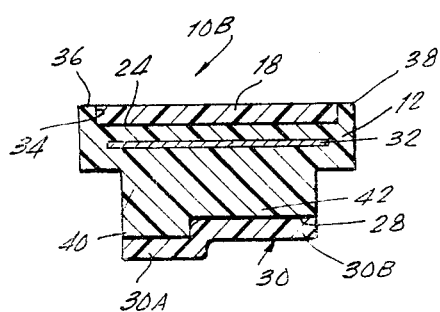
FIG. 5
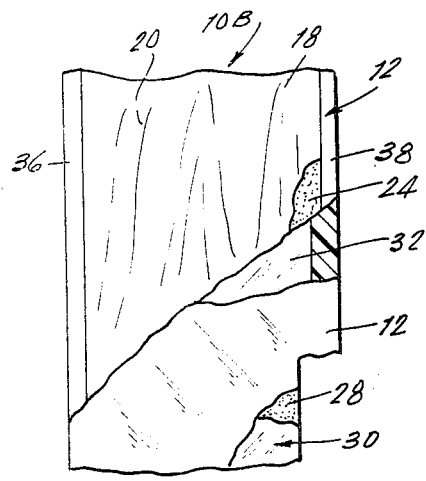
FIG. 6
INVENTORS
VICTOR SHANOK
JESSE P. SHANOK
BY Friedman + Goodman
ATTORNEYS

United States Patent Office 3,509,001
Patented Apr. 28, 1970

---

3,509,001
SIMULATED WOOD TRIM STRIP
Victor Shanok and Jesse P. Shanok, Brooklyn, N.Y., assignors to Glass Laboratories Company, Brooklyn, N.Y., a limited partnership of New York
Filed Jan. 12, 1966, Ser. No. 520,133
Int. Cl. B44f 1/02, 9/02
U.S. Cl. 161—5   4 Claims

ABSTRACT OF THE DISCLOSURE

A trim strip comprising an elongated plastic base strip having a predetermined color, a clear decorative facing strip secured thereto along one longitudinally extending surface, the facing strip being a flexible plastic material having a decorative pattern provided thereon, and a mounting strip of flexible plastic material secured to the opposing longitudinally extending surface.

---

The present invention relates in general to trim strip material particularly strips having the appearance and function of wooden molding.

It is an object of the present invention to provide a highly novel trim strip which can be secured directly to a supporting surface and which obviates the necessity for providing a groove in the support surface in which there is received a stem provided on the trim strip as in the prior art.

Other and further advantages and objects of the present invention will be readily apparent to one skilled in the art from a consideration of the following specification taken in connection with the appended drawing.

In the drawing, which illustrates the best modes presently contemplated for carrying out the invention, FIGURE 1 is a cross-sectional view taken through a trim strip pursuant to the present invention;

FIGURE 2 is a top plan view of the strip illustrated in FIGURE 1 with portions broken away for purposes of illustration;

FIGURE 3 is a cross-sectional view taken through a modified form of trim strip;

FIGURE 4 is a top plan view of the strip illustrated in FIGURE 3 with portions being broken away for purposes of illustration;

FIGURE 5 is a cross-sectional view taken through another form of trim strip pursuant to the present invention; and FIGURE 6 is a top plan view of the strip illustrated in FIGURE 5 with portions broken away for purposes of illustration.

Referring now to FIGURES 1 and 2 of the drawing in detail, there is shown a continuous trim strip 10 pursuant to the present invention. The trim stip 10 comprises an elongated base strip 12 which is formed of a suitable material so that the base strip is a longitudinally flexible plastic material which, however, is relatively rigid in its transverse dimension. Any suitable rigid thermoplastic material may be used for the base material, preferably, cellulose acetate butyrate is utilized for the purpose so as to provide a base strip having the foregoing characteristics, namely, one which is longitudinally flexible to the desired degree but which is relatively rigid in its transverse dimension.

The extruded base strip 12 is preferably colored according to the particular type of wood which it will represent. For example, where the decorative trim strip 10 is to simulate a mahogany wood strip, the base strip 12 is colored a reddish brown. For representing a walnut trim strip, the base strip 12 is colored brown. For representing a cherrywood decorative strip, the base strip 12 is colored red. For representing a white oak decorative strip, the base strip 12 is colored white. Consequently, it will be apparent that in order to simulate a variety of different decorative woods, all that is required is to maintain a supply or inventory of base strips in accordance with the fundamental basic colors of the various woods which are to be simulated.

Each base strip 12 is provided with an elongated upper surface or face 16 which is adapted to receive and mount a decorative strip or foil 18. The facing strip 18 is formed of a suitable material, preferably, plasticized polyvinyl chloride or co-polymers thereof which is in the form of a relatively thin film and which is flexible. The strip 18 is clear and transparent and is provided with suitable decoration, preferably, as here shown, a decoration 20 which gives the decorative strip 18 the appearance of a wood surface. The decoration 20 is advantageously provided on strip 18 along the lower or bottom surface 22 thereof. Since the strip 18 is clear and transparent, it will be readily apparent that the decorative wood grain affect 20 is clearly visible through the strip 18. The under or decorative surface 22 of the decorative strip 18 is provided with a suitable adhesive coating 24 which is of the heat sensitive type or thermoplastic type. It will be understood that the adhesive coating may be softened and rendered relatively tacky by radiant heat emanating from the cross head of the extrusion apparatus which is utilized to fabricate the decorative strip 10 or in any other suitable convenient manner.

Pursuant to a highly novel aspect of the present invention, the decorative trim strip 10 may be secured directly to a suitable surface to which the trim strip is to be attached. For this purpose, the under surface 26 of the base strip 12 is provided with a suitable adhesive coating 28 which preferably is similar to the previously described adhesive coating 24. The adhesive coating 28 is utilized to secure to the under surface 26 of the base strip 12 an attaching strip or layer 30 by means of which the trim strip 10 may be secured to a suitable support.

As in the case of the facing strip 18, the attachment strip 30 is also preferably formed of a plasticized polyvinyl chloride or copolymers thereof which is, as here shown, in the form of a relatively thin film and which is flexible. The attaching strip 30 is preferably clear and transparent and is free of any suitable surface decoration.

The utilization of the plasticized attachment strip 30 renders the trim strip 10 readily attachable or secureable to a suitable underlying surface. More particularly, the attaching layer 30 may be readily heat sealed to a surface formed of vinyl or other similar plastic material. In this manner, the trim strip 10 may be conveniently attached to an underlying surface in a relatively secure and efficient manner.

Referring to FIGURES 3 and 4, there is shown a modified form of trim strip which is generally designated by the reference numeral 10A. The trim strip 10A is substantially similar to the previously described trim strip 10 and similar parts are designated by similar reference numerals. The basic difference between the trim strip 10 and the trim strip 10A is that the latter is provided with a preferably metallic strip or foil 32. More specifically, the metallic strip 32 is encased or sheathed by the base strip 12. This may be readily accomplished during the operation of the extruding apparatus which forms the base strip 12. The utilization of the metallic foil 32 adds a highly novel and effective design aspect to the trim strip 10A. As previously indicated in all other respects, the trim strip 10A is the same as the trim strip 10.

Referring now to the FIGURES 5 and 6, there is illustrated another modified form of trim strip which is generally designated by the reference numeral 10B. The trim strip 10B is basically similar to the trim strips 10 and 10A respectively and it will be understood that similar parts are identified by similar reference numerals. It will be noted that the trim strip 10B is also provided with a metallic strip or foil 32 which is encased or sheathed by the base strip 12. However, it will be noted that in the present embodiment, the base strip 12 is provided at the outer or front surface thereof with a recess 34 in which the decorative strip 18 is seated and in which it is secured by means of the adhesive coating 24. Due to the utilization of the recess 34, it will be noted that longitudinally thereof the decorative strip 18 is bordered by the longitudinally extending portions 36 and 38 of the base strip 12. This serves to add another highly attractive design aspect to the trim strip 10B.

The trim strip 10B is especially adapted to be secured to an irregular surface or support. For this purpose, it will be noted that the base strip 12 is provided with an elongation which forms a leg 40 thereon which projects from the remaining portion thereof so as to define the long leg 40 and the remaining portion which may conveniently be designated as a short leg 42. It will be understood that the short leg 42 and the long leg 40 will accomodate the base strip 12 to irregularities which may be defined in the surface to which the trim strip 10B is to be secured. In order to effect the securement as by heat sealing or similar means to a surface formed of vinyl or similar material, provision is made for the previously a first portion 30A secured to the longer leg 40 and a mentioned adhesive attaching strip or layer 30 which has second portion 30B secured to the shorter leg 42. In each case, it will be understood that the portions 30A and 30B are secured by means of the adhesive layer or coating 28 to the respective portions of the base strip 12. Consequently, it will be apparent that the trim strip 10B incorporates the various features of both the trim strips 10 and 10A and in addition, is particularly adapted for securement to irregular surfaces.

In view of the foregoing, it will be apparent that there has been illustrated and described a highly novel composite trim strip which will provide, if desired, a highly novel wood grain design effect and which can be secured by heat sealing or similar means directly to a surface formed of vinyl or other similar material so as to duplicate the appearance of a true wood grain trim strip secured to such a surface. It will be understood that various changes and modifications may be made within the present invention without, however, departing from the basic inventive concept thereof as set forth in the appended claims.

We claim:
1. A trim strip comprising an elongated base strip having a predetermined color to simulate wood and formed of relatively rigid plastic material comprising cellulose acetate butyrate, a clear decorative facing strip secured thereto along one longitudinally extending surface, said facing strip being formed of a relatively flexible plastic material selected from the group consisting of plasticized polyvinyl chloride and co-polymers thereof and having a decorative pattern provided thereon, and a mounting strip formed of relatively flexible material selected from the group consisting of plasticized polyvinyl chloride and co-polymers thereof secured to the opposing longitudinally extending surface of said base strip whereby said trim strip may be secured to a supporting surface and a flexible metallic foil encased in said base strip.

2. A trim strip as set forth in claim 1, wherein a longitudinal recess is defined in said one surface of said base strip and said facing strip is seated in said recess.

3. A trim strip as set forth in claim 2, wherein said opposing surface has an irregular conformation, and said mounting strip is complementary to said irregular conformation.

4. A trim strip as in claim 1, wherein said opposing surface has a long leg and a short leg and said mounting strip has a first portion secured to said long leg and a second portion secured to sid short leg.

References Cited

UNITED STATES PATENTS

| | | | |
|---|---|---|---|
| 2,609,278 | 9/1952 | Eyles | 161—5 |
| 2,928,201 | 3/1960 | Shanok et al. | 161—6 |
| 3,226,287 | 12/1965 | Shanok et el. | 161—4 |
| 3,264,164 | 8/1966 | Jerothe et al. | 161—6 |

JACOB H. STEINBERG, Primary Examiner

U.S. Cl. X.R.

161—6, 138